(12) United States Patent
Eibeck et al.

(10) Patent No.: US 8,530,568 B2
(45) Date of Patent: *Sep. 10, 2013

(54) FLOWABLE POLYAMIDES WITH HYPERBRANCHED POLYESTERS/POLYCARBONATES

(75) Inventors: Peter Eibeck, Speyer (DE); Bernd Bruchmann, Freinsheim (DE); Andreas Eipper, Osnabrück (DE); Jean-Francois Stumbe, Strasbourg (FR); Ralf Neuhaus, Heidelberg (DE); Michael Fischer, Ludwigshafen (DE); Jochen Engelmann, Neustadt (DE); Philippe Desbois, Edingen-Neckarhausen (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/409,450

(22) Filed: Mar. 1, 2012

(65) Prior Publication Data

US 2012/0157605 A1 Jun. 21, 2012

Related U.S. Application Data

(63) Continuation of application No. 11/577,590, filed as application No. PCT/EP2005/011074 on Oct. 14, 2005, now abandoned.

(30) Foreign Application Priority Data

Oct. 20, 2004 (DE) .......................... 10 2004 051 241

(51) Int. Cl.
*C08L 77/00* (2006.01)

(52) U.S. Cl.
USPC .......................................... 524/537; 525/425

(58) Field of Classification Search
USPC ........................................................ 524/527
See application file for complete search history.

(56) References Cited

U.S. PATENT DOCUMENTS

| 3,479,314 A | 11/1969 | Williams |
|---|---|---|
| 3,491,048 A | 1/1970 | Sargent |
| 4,002,581 A | 1/1977 | Dolce |
| 4,148,848 A | 4/1979 | Owens et al. |
| 4,164,114 A | 8/1979 | Yabuki et al. |
| 4,212,791 A | 7/1980 | Avery et al. |
| 4,239,677 A | 12/1980 | Dieck |
| 4,269,964 A | 5/1981 | Freutag et al. |
| 4,351,916 A | 9/1982 | Kohan |
| 4,396,742 A | 8/1983 | Binsack et al. |
| 4,732,949 A | 3/1988 | Paul et al. |
| 4,771,109 A | 9/1988 | Eichenauer et al. |
| 4,873,289 A | 10/1989 | Linder et al. |
| 4,882,381 A | 11/1989 | Wittmann et al. |
| 4,935,488 A * | 6/1990 | Omatsu et al. ............... 528/272 |
| 5,010,135 A | 4/1991 | Eckel et al. |
| 5,136,014 A | 8/1992 | Figuly |
| 5,144,005 A | 9/1992 | Sextro et al. |
| 5,157,076 A | 10/1992 | Greenlee et al. |
| 5,250,595 A | 10/1993 | Miyashita et al. |
| 5,314,949 A | 5/1994 | Kozakura et al. |
| 5,348,699 A | 9/1994 | Meyer et al. |
| 5,399,620 A | 3/1995 | Niessner et al. |
| 5,468,530 A | 11/1995 | Gotz et al. |
| 5,496,887 A | 3/1996 | Braune |
| 5,510,398 A | 4/1996 | Clark et al. |
| 5,552,224 A * | 9/1996 | Laughner et al. ............. 428/401 |
| 5,608,030 A | 3/1997 | Hoffmockel et al. |
| 5,621,031 A | 4/1997 | Leimann et al. |
| 5,712,336 A | 1/1998 | Gareiss et al. |
| 5,844,059 A | 12/1998 | Yamamoto et al. |
| 5,965,652 A | 10/1999 | El Sayed et al. |
| 5,998,565 A | 12/1999 | de Brabander-van den Berg et al. |
| 6,037,444 A | 3/2000 | Rannard et al. |
| 6,084,012 A * | 7/2000 | Gareiss et al. .................. 524/80 |
| 6,087,449 A | 7/2000 | Tiefensee et al. |
| 6,232,435 B1 | 5/2001 | Heitz et al. |
| 6,252,025 B1 | 6/2001 | Wang et al. |
| 6,262,185 B1 | 7/2001 | Heitz et al. |
| 6,300,424 B1 | 10/2001 | Frechet et al. |
| 6,319,576 B1 | 11/2001 | Rule et al. |
| 6,391,982 B1 | 5/2002 | Haeger et al. |
| 6,497,959 B1 * | 12/2002 | Mhetar ........................ 428/412 |
| 6,528,612 B1 | 3/2003 | Brenner et al. |
| 6,784,233 B1 | 8/2004 | Weber et al. |
| 6,894,112 B1 | 5/2005 | Weber et al. |
| 7,081,509 B2 | 7/2006 | Wagner et al. |

(Continued)

FOREIGN PATENT DOCUMENTS

| BE | 702357 | 2/1968 |
|---|---|---|
| BE | 720658 | 11/1969 |

(Continued)

OTHER PUBLICATIONS

K. Pochner, et al., Treatment of Polymers for subsequent metallization using intense UV radiation or plasma at atmospheric pressure, 1997, 372-377, Surface and Coatings Technology 97.

(Continued)

*Primary Examiner* — Doris Lee
(74) *Attorney, Agent, or Firm* — Novak Druce Connolly Bove + Quigg LLP

(57) ABSTRACT

Thermoplastic molding compositions, comprising

A) from 10 to 99% by weight of at least one thermoplastic polyamide,

B) from 0.01 to 50% by weight of

B1) at least one highly branched or hyperbranched polycarbonate with an OH number of from 1 to 600 mg KOH/g of polycarbonate (to DIN 53240, Part 2), or B2) at least one highly branched or hyperbranched polyester of $A_xB_y$ type, where x is at least 1.1 and y is at least 2.1, or a mixture of these, C) from 0 to 60% by weight of other additives, where the total of the percentages by weight of components A) to C) is 100%.

20 Claims, No Drawings

(56) References Cited

U.S. PATENT DOCUMENTS

| | | |
|---|---|---|
| 8,278,381 B2 | 10/2012 | Engelmann et al. |
| 8,293,823 B2 | 10/2012 | Engelmann et al. |
| 8,362,136 B2 | 1/2013 | Eipper et al. |
| 8,362,146 B2 | 1/2013 | Eipper et al. |
| 2002/0077403 A1 | 6/2002 | Gittinger et al. |
| 2002/0120076 A1 | 8/2002 | Schueler et al. |
| 2002/0161113 A1 | 10/2002 | Dvornic et al. |
| 2003/0018104 A1 | 1/2003 | Mours et al. |
| 2003/0069370 A1 | 4/2003 | Dvornic et al. |
| 2003/0082384 A1 | 5/2003 | Mhetar |
| 2003/0171503 A1 | 9/2003 | Adedeji |
| 2003/0195296 A1 | 10/2003 | Dames et al. |
| 2004/0138388 A1 | 7/2004 | Pecorini et al. |
| 2004/0220374 A1 | 11/2004 | Heuer et al. |
| 2005/0054812 A1 | 3/2005 | Wagner et al. |
| 2005/0124779 A1 | 6/2005 | Shelby et al. |
| 2005/0165177 A1 | 7/2005 | Wagner et al. |
| 2006/0142442 A1 | 6/2006 | Scherzer et al. |
| 2007/0173617 A1 | 7/2007 | Eipper et al. |
| 2007/0244227 A1 | 10/2007 | Eipper et al. |
| 2007/0257240 A1 | 11/2007 | Engelmann et al. |
| 2008/0015303 A1 | 1/2008 | Eibeck et al. |
| 2008/0064827 A1 | 3/2008 | Eipper et al. |
| 2008/0076859 A1 | 3/2008 | Eipper et al. |
| 2008/0139715 A1 | 6/2008 | Scherzer et al. |
| 2009/0030140 A1 | 1/2009 | Eipper et al. |
| 2012/0145948 A1 | 6/2012 | Fukuhara et al. |
| 2012/0202931 A1 | 8/2012 | Scherzer et al. |
| 2012/0232212 A1 | 9/2012 | Eipper et al. |

FOREIGN PATENT DOCUMENTS

| | | |
|---|---|---|
| CA | 2019904 | 1/1991 |
| CA | 733567 | 5/1996 |
| CA | 2256343 | 12/1997 |
| CA | 2312457 | 12/2000 |
| CA | 2554037 | 8/2005 |
| CA | 2554038 | 8/2005 |
| DE | 222868 | 6/1910 |
| DE | 2842005 A1 | 4/1980 |
| DE | 3334782 A1 | 10/1984 |
| DE | 3506472 A1 | 8/1986 |
| DE | 3725576 | 2/1989 |
| DE | 3800603 | 7/1989 |
| DE | 4307392 | 4/1994 |
| DE | 4328004 | 2/1995 |
| DE | 10030553 A1 | 1/2002 |
| DE | 10136911 | 2/2003 |
| DE | 10138216 A1 | 2/2003 |
| DE | 10147712 | 4/2003 |
| DE | 10163163 | 7/2003 |
| DE | 10260098 A1 | 7/2004 |
| DE | 10304341 | 8/2004 |
| DE | 102004057867 | 6/2006 |
| DE | 102005012482 | 9/2006 |
| EP | 0050265 | 4/1982 |
| EP | 0122535 A2 | 10/1984 |
| EP | 0047529 | 6/1985 |
| EP | 187176 A1 | 7/1986 |
| EP | 0208187 | 1/1987 |
| EP | 0235690 | 9/1987 |
| EP | 0319290 | 6/1989 |
| EP | 365916 A1 | 5/1990 |
| EP | 0410301 | 1/1991 |
| EP | 0484737 | 5/1992 |
| EP | 0545184 | 6/1993 |
| EP | 0629644 | 12/1994 |
| EP | 711810 A1 | 5/1996 |
| EP | 0736571 | 10/1996 |
| EP | 319290 A2 | 6/1998 |
| EP | 1065236 A2 | 1/2001 |
| EP | 1099727 | 5/2001 |
| EP | 1344794 | 9/2003 |
| EP | 1424362 | 6/2004 |
| FR | 2856693 | 12/2004 |
| GB | 1458561 | 12/1976 |
| GB | 1558308 | 12/1979 |
| JP | 54103475 A | 8/1979 |
| JP | 04018426 A | 1/1992 |
| JP | 4175366 | 6/1992 |
| JP | 2006/100758 | 9/1992 |
| JP | 06157880 | 11/1992 |
| JP | 08269306 | 3/1995 |
| JP | 09157503 | 12/1995 |
| JP | 11060663 | 3/1999 |
| JP | 11255853 | 9/1999 |
| JP | 11279245 | 10/1999 |
| SU | 519449 | 6/1976 |
| WO | WO-96/11962 | 4/1996 |
| WO | WO-96/19537 A1 | 6/1996 |
| WO | WO-97/05705 | 2/1997 |
| WO | WO-97/08241 | 3/1997 |
| WO | WO-2005/058385 | 10/2000 |
| WO | WO-02/32982 | 4/2002 |
| WO | WO-03/064502 | 8/2003 |
| WO | WO-03/093343 A1 | 11/2003 |
| WO | WO-2004056914 A1 | 7/2004 |
| WO | WO-2004069912 A1 | 8/2004 |
| WO | WO-2004/087785 | 10/2004 |
| WO | WO-2004/111126 | 12/2004 |
| WO | WO-2005/012380 | 2/2005 |
| WO | WO-2005/075563 | 8/2005 |
| WO | WO-2005/075565 | 8/2005 |
| WO | WO-03/004546 | 1/2006 |
| WO | WO-2006008055 A1 | 1/2006 |
| WO | WO-2006/018127 | 2/2006 |
| WO | WO-2006/018128 | 2/2006 |
| WO | WO-2006/018179 | 2/2006 |
| WO | WO-2006/040066 | 4/2006 |
| WO | WO-2006/040101 | 4/2006 |
| WO | WO-2006/042673 | 4/2006 |
| WO | WO-2006040101 A1 | 4/2006 |
| WO | WO-2006/082201 | 8/2006 |
| WO | WO-2006/134115 | 12/2006 |
| WO | WO-2007/009929 | 1/2007 |
| WO | WO-2007/009930 | 1/2007 |
| WO | WO-2008/074687 | 6/2008 |

OTHER PUBLICATIONS

A. Weber, et al., Metallization of Polymers Using Plasma-Enhanced Chemical Vapor Deposited Titanium Nitride as Interlayer, Mar. 1997, 1131-1135, Journal of The Electrochemical Society, vol. 14, No. 3.

H. Horn, et al., Excimer laser pretreatment and metallization of polymers, 1999, 270-284, Nuclear Instruments and Methods in Physics Research B151.

Gorda, et al., "Star Shaped Condensation Polymers: Synthesis, Characterization, and Blend Properties", Journal of Applied Polymer Science (1993), pp. 1977-1983, vol. 50.

Sunder, et al., "Synthesis and Thermal Behaviour of Esterfied Alipghatic Hyperbranched Polyether Polyols", *Macromolecules* (2000), pp. 1330-1337, vol. 33.

Jang, Jyongsik, et al., "Crystallization Behaviour of Poly (ethylene terephthalate) Blended with Hyperbranched Polmers: The Effect of Terminal Groups and Composition of Hyperbranched Polymers". *Macromolecules*, 2000, 33, 1864-1870, XP-001079109.

P. Carr, et al., "Dielectric and mechanical characterization of aryl ester dendrimer/PET belnds", Polymer, vol. 37, No. 12, 1996, pp. 2395-2401.

Lin, et al., "Polymerization of $A_2$ with $B_3$ Monomers: A Facile Approach to Hyperbranched Poly(aryl ester)s", *Macromolecules*, No. 36, 2003, pp. 9809-9816.

Luman, et al., "The Convergent Synthesis of Poly(glycerol-succinic acid) Dendritic macromolecules", Chem. Eur. J., No. 9, 2003, pp. 5618-5626.

International Preliminary Report on Patentability for International Application No. PCT/EP2006/063167, issued Jan. 16, 2008.

International Preliminary Report on Patentability for International Application No. PCT/EP2006/063167, issued Dec. 17, 2007.

International Preliminary Report on Patentability for International Application No. PCT/EP2006/064182, issued Jan. 22, 2008.

International Preliminary Report on Patentability for International Application No. PCT/EP2006/064182, issued Feb. 5, 2008.

International Preliminary Report on Patentability for International Application No. PCT/EP2006/064180, issued Feb. 5, 2008.

International Preliminary Report on Patentability for International Application No. PCT/EP2006/064180, issued Jan. 22, 2008.
International Preliminary Report on Patentability for International Application No. PCT/EP2005/010854, issued Nov. 6, 2006.
International Preliminary Report on Patentability for International Application No. PCT/EP2005/001015, issued May 8, 2006.
International Preliminary Report on Patentability for International Application No. PCT/EP2006/050590, issued Aug. 14, 2007.
International Preliminary Report on Patentability for International Application No. PCT/EP2006/050590, issued Aug. 7, 2007.
International Preliminary Report on Patentability for International Application No. PCT/EP2005/010762, issued Apr. 24, 2007.
International Preliminary Report on Patentability for International Application No. PCT/EP2005/008339, issued Aug. 11, 2006.
International Preliminary Report on Patentability for PCT/EP2005/011704, dated Oct. 14, 2005, 13 pages.
Stumbe et al., "Hyperbranched Polyesters Based on Adipic Acid and Glyercol," Macromolecular Rapid Communications, 2004, pp. 921-924.
Voit, "Hyperbranched Polymers—All Problems Solved After 15 Years of Research?", Journal of Polymer Science, Part A: Polymer Chemistry, vol. 43, 2005, pp. 2679-2699.
Bolton et al., "Synthesis and Characterization of Hyperbranched Polycarbonates", Macromolecules, 1997, 30, 1890-1896.
English translation of International Preliminary Report on Patentability issued Jan. 12, 2007 in corresponding Application PCT/EP2005/010954.
Bottenbruch et al., "Polyamide", Kunststoff Handbuch (Plastics Handbook), vol. 3, No. 4, 1998, pp. 411 and 666-670.
Ehrenstein et al., Hochgefullte Kunststoffe, "Mit definierten magnetischen, thermischen und elektrischen Eigenschaften," Ehrenstein et al., Springer VDI Verlag, Dusseldorf, 2002, "Fliebverbesserung Hochgefullter Kunststoffe," Eric Richter, Clariant GmbH, Division Pigmente und Additive, Gersthofen, pp. 155-178.

* cited by examiner

FLOWABLE POLYAMIDES WITH HYPERBRANCHED POLYESTERS/POLYCARBONATES

CROSS REFERENCE TO RELATED APPLICATIONS

This application is a continuation of U.S. patent application Ser. No. 11/577,590 filed Aug. 19, 2007, which is a National Phase of International Application No. PCT/EP2005/011074 filed on Oct. 14, 2005, which claims priority to Application No. 102004051241.8 filed in Germany on Oct. 20, 2004 under 35 U.S.C. §119; the entire contents of all are hereby incorporated by reference.

The invention relates to thermoplastic molding compositions, comprising
A) from 10 to 99% by weight of at least one thermoplastic polyamide,
B) from 0.01 to 50% by weight of
B1) at least one highly branched or hyperbranched polycarbonate with an OH number of from 1 to 600 mg KOH/g of polycarbonate (to DIN 53240, Part 2), or
B2) at least one highly branched or hyperbranched polyester of $A_xB_y$ type, where x is at least 1.1 and y is at least 2.1, or a mixture of these,
C) from 0 to 60% by weight of other additives,
where the total of the percentages by weight of components A) to C) is 100%.

The invention further relates to the use of the inventive molding compositions for production of fibers, of foils, or of moldings of any type, and also to the resultant moldings.

Polycarbonates are usually obtained from the reaction of alcohols with phosgene, or from transesterification of alcohols or of phenols, using dialkyl or diarylcarbonates. Aromatic polycarbonates are important industrially and are prepared, by way of example, from bisphenols, whereas aliphatic polycarbonates are less important in terms of market volume. In this connection, see also Becker/Braun, Kunststoff-Handbuch [Plastics Handbook] Vol. 3/1, Polycarbonate, Polyacetale, Polyester, Celluloseester [Polycarbonates, polyacetals, polyesters, cellulose esters], Carl-Hanser-Verlag, Munich 1992, pages 118-119.

The aliphatic polycarbonates described are generally linear or else have a structure with a very small degree of branching. For example, U.S. Pat. No. 3,305,605 describes the use of solid linear polycarbonates whose molecular weight is above 15 000 dalton as plasticizers for polyvinyl polymers.

Low-molecular-weight additives are usually added to thermoplastics in order to improve flowability. However, these additives have very limited effectiveness because, for example, the fall-off in mechanical properties becomes unacceptable when the amount added of the additive is increased.

High-functionality polycarbonates of defined structure have been known only for a short time.

S. P. Rannard and N. J. Davis, J. Am. Chem. Soc. 2000, 122, 11729 describe preparation of perfectly branched dendrimeric polycarbonates via reaction of carbonylbisimidazole, as phosgene-analogous compound, with bishydroxyethylamino-2-propanol. Syntheses to give perfect dendrimers have four stages and are therefore expensive and not very suitable for industrial scale-up.

D. H. Bolton and K. L. Wooley, Macromolecules 1997, 30, 1890 describe the preparation of high-molecular-weight, high-rigidity hyperbranched aromatic polycarbonates via reaction of 1,1,1-tris(4'-hydroxy)phenylethane with carbonylbisimidazole.

Hyperbranched polycarbonates may also be prepared as in WO 98/50453. In the process described there, triols are again reacted with carbonylbisimidazole. The first product is imidazolides, and these are then further reacted intermolecularly to give the polycarbonates. The method mentioned gives the polycarbonates in the form of colorless or pale yellow rubbery products.

The syntheses mentioned giving highly branched or hyperbranched polycarbonates have the following disadvantages:
a) the hyperbranched products either have high melting point or are rubbery, and this markedly restricts subsequent processability.
b) imidazole liberated during the reaction has to be removed from the reaction mixture in a complicated process.
c) the reaction products always comprise terminal imidazolide groups. These groups are labile and have to be converted into, for example, hydroxy groups by way of a subsequent step.
d) carbonyldiimidazole is a comparatively expensive chemical which greatly increases raw material costs.

WO-97/45474 discloses thermoplastic compositions which comprise dendrimeric polyesters in the form of an $AB_2$ molecule in a polyester. Here, a polyhydric alcohol as core molecule reacts with dimethylolpropionic acid as $AB_2$ molecule to give a dendrimeric polyester. This comprises only OH functionalities at the end of the chain. Disadvantages of these mixtures are the high glass transition temperature of the dendrimeric polyesters, the comparatively complicated preparation process, and especially the poor solubility of the dendrimers in the polyamide matrix.

According to the teaching of DE-A 101 32 928, the incorporation of branching agents of this type by means of compounding and solid-phase post-condensation improves mechanical properties (molecular weight increase). Disadvantages of the process variant described are the long preparation time and the disadvantageous properties previously mentioned.

DE 102004 005652.8 and DE 102004 005657.9 have previously proposed novel flow improvers for polyesters.

The prior art discloses additives for improving flow in polyamides:
FR-A 28 33 603: hyperbranched polyamides as rheology modifiers for PA
U.S. Pat. No. 6,541,599 soluble hyperbranched polyamides and their use, inter alia as rheology modifiers for thermoplastics
DE-A 102 51 294: branched PA as additive for transparent, amorphous PAs
DE-A 102 55 044: terminal-polyfunctional (i.e. branched, hyperbranched, dendritic) polymers of the group of polyesters, polyglycerols, polyethers as rheology modifiers in PA and PBT.
EP-A 682 057 describes an improved-flow nylon-6 with a specific first-generation 1,4-diaminobutane[4]propylamine dendrimer. DE-A 19953 950 describes flowable compounded polyamide materials with highly branched polyetheramides as reagent. The flow improver in this case is synthesized from monomeric oxazoline units. The effect first becomes apparent on addition of 10% of polyetheramide. Universal applicability is lacking in both examples, and moreover the synthesis of the dendrimers described is inconvenient and expensive. The improvement in flow activity, 5%, is not entirely satisfactory, and a fall-off in mechanical properties is also observed.

It was therefore an object of the present invention to provide thermoplastic polyamide molding compositions which have good flowability together with good mechanical properties.

Accordingly, the molding compositions defined at the outset have been found. Preferred embodiments are found in the subclaims.

The inventive molding compositions comprise, as component A), from 25 to 99% by weight, preferably from 30 to 98% by weight, and in particular from 40 to 95% by weight, of at least one polyamide.

The polyamides of the inventive molding compositions generally have a viscosity number of from 90 to 350 ml/g, preferably from 110 to 240 ml/g, determined in a 0.5% strength by weight solution in 96% strength by weight sulfuric acid at 25° C. to ISO 307.

Semicrystalline or amorphous resins with a molecular weight (weight-average) of at least 5000, e.g. those described in the American patent specifications 2 071 250 2 071 251, 2 130 523, 2 130 948, 2 241 322, 2 312 966, 2 512 606, and 3 393 210 are preferred.

Examples of these are polyamides derived from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having from 6 to 12, in particular from 6 to 10, carbon atoms, and aromatic dicarboxylic acids. Acids which may be mentioned here merely as examples are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine, di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamides are polyhexamethyleneadipamide, polyhexamethylenesebacamide and polycaprolactam, and also nylon-6/6,6 copolyamides, in particular having a proportion of from 5 to 95% by weight of caprolactam units.

Other suitable polyamides are obtainable from w-aminoalkyl nitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio.

Other polyamides which have proven particularly advantageous are semiaromatic copolyamides, such as PA 6/6T and PA 66/6T, where the triamine content of these is less than 0.5% by weight, preferably less than 0.3% by weight (see EP-A 299 444 and EP-A 667 367).

Preferred polyamides are composed of:
A1) from 20 to 90% by weight of units which derive from terephthalic acid and from hexamethylenediamine,
A2) from 0 to 50% by weight of units which derive from ε-caprolactam, and
A3) from 0 to 80% by weight of units which derive from adipic acid and from hexamethylenediamine,
A4) from 0 to 40% by weight of other polyamide-forming monomers, where the proportion of component (A2) or (A3) or (A4) or their mixtures is at least 10% by weight.

Component A1) comprises from 20 to 90% by weight of units which derive from terephthalic acid and from hexamethylenediamine.

The copolyamides comprise, alongside the units which derive from terephthalic acid and from hexamethylenediamine, units which derive from ε-caprolactam and/or units which derive from adipic acid and from hexamethylenediamine and/or units which derive from other polyamide-forming monomers.

The proportion of units which derive from ε-caprolactam is at most 50% by weight, preferably from 20 to 50% by weight, in particular from 25 to 40% by weight, while the proportion of units which derive from adipic acid and from hexamethylenediamine is up to 80% by weight, preferably from 30 to 75% by weight, and in particular from 35 to 60% by weight.

The copolyamides may also comprise not only units from ε-caprolactam but also units from adipic acid and hexamethylenediamine; in this case, it is advantageous for the proportion of units free from aromatic groups to be at least 10% by weight, preferably at least 20% by weight. The ratio of the units which derive from ε-caprolactam and from adipic acid and from hexamethylenediamine is not subject to any restriction here.

Polyamides having from 50 to 80% by weight, in particular from 60 to 75% by weight, of units which derive from terephthalic acid and from hexamethylenediamine (units A1)) and from 20 to 50% by weight, preferably from 25 to 40% by weight, of units which derive from ε-caprolactam (units A2)) have proven particularly advantageous for many applications.

The semiaromatic copolyamides can comprise, alongside the units A1) to A3) described above, amounts of up to 40% by weight, preferably from 10 to 30% by weight, and in particular from 20 to 30% by weight, of other polyamide-forming monomers A4), these being known from other polyamides.

Aromatic dicarboxylic acids A4) have from 8 to 16 carbon atoms. Examples of suitable aromatic dicarboxylic acids are isophthalic acid, substituted terephthalic acid and substituted isophthalic acid, e.g. 3-tert-butylisophthalic acid, polynuclear dicarboxylic acids, e.g. 4,4'- and 3,3'-biphenyldicarboxylic acid, 4,4'- and 3,3'-diphenylmethane-dicarboxylic acid, 4,4'- and 3,3'-diphenyl sulfone dicarboxylic acid, 1,4- or 2,6-naphthalenedicarboxylic acid, phenoxyterephthalic acid, particularly preferably isophthalic acid.

Other polyamide-forming monomers A4) can derive from dicarboxylic acids having from 4 to 16 carbon atoms and from aliphatic or cycloaliphatic diamines having from 4 to 16 carbon atoms, and also from aminocarboxylic acids or from corresponding lactams having from 7 to 12 carbon atoms. Suitable monomers of this type which may be mentioned here merely by way of example are suberic acid, azelaic acid, or sebacic acid as representatives of the aliphatic dicarboxylic acids, 1,4-butanediamine, 1,5-pentanediamine, piperazine, 4,4'-diaminodicyclohexylmethane, 2,2-(4,4'-diamino-dicyclohexyl)propane, 3,3'-dimethyl-4,4'-diaminodicyclohexylmethane, or meta-xylylenediamine as representatives of the diamines, and caprylolactam, enantholactam, ω-aminoundecanoic acid, and laurolactam as representatives of lactams and aminocarboxylic acids.

The following constitutions of component (A) are particularly preferred here:

A1) from 65 to 85% by weight of units which derive from terephthalic acid and from hexamethylenediamine, A4) from 15 to 35% by weight of units which derive from isophthalic acid and from hexamethylenediamine, or A1) from 50 to 70% by weight of units which derive from terephthalic acid and from hexamethylenediamine, and A3) from 10 to 20% by weight of units which derive from adipic acid and from hexamethylenediamine, and A4) from 20 to 30% by weight of units which derive from isophthalic acid and from hexamethylenediamine.

If component (A) comprises symmetrical dicarboxylic acids in which the carboxy groups are in para-8 position, it is advisable to structure these with (A1) and (A2) or (A1) and (A3) as ternary copolyamides, since otherwise the copolymer would have an excessively high melting point and would only melt with decomposition, this being undesirable.

Other copolyamides which have proven particularly advantageous are those semiaromatic copolyamides whose triamine content is less than 0.5% by weight, preferably less than 0.3% by weight.

Semiaromatic copolyamides prepared by most of the known processes (cf. U.S. Pat. No. 4,603,166) have triamine contents above 0.5% by weight, and this leads to impairment of product quality and to problems in continuous preparation. A particular triamine which may be mentioned of causing these problems is dihexamethylene-triamine, which forms from the hexamethylenediamine used during the preparation process.

Copolyamides with low triamine content have lower melt viscosities at the same solution viscosity, when compared with products of the same constitution which have high triamine content. This improves not only processability but also product properties considerably.

The melting points of the semiaromatic copolyamides are in the range from 270 to 325° C., preferably from 280 to 310° C., and this high melting point is also associated with a high glass transition temperature which is generally above 75° C., in particular above 85° C. (in the dry state).

Binary copolyamides based on terephthalic acid, hexamethylenediamine and ε-caprolactam have melting points in the region of 300° C. and (in the dry state) a glass transition temperature above 110° C. if they have about 70% content of units which derive from terephthalic acid and from hexamethylenediamine.

Binary copolyamides based on terephthalic acid, adipic acid, and hexamethylene-diamine achieve melting points of 300° C. and above even at relatively low contents of about 55% by weight of units derived from terephthalic acid and hexamethylenediamine (HMD), but the glass transition temperature here is not quite as high as for binary copolyamides which comprise ε-caprolactam instead of adipic acid or adipic acid/HMD.

According to the invention, the semiaromatic copolyamides are those whose degree of crystallinity is >10%, preferably >15%, and in particular >20%.

The degree of crystallinity is a measure of the fraction of crystalline fragments in the copolymer and is determined via X-ray diffraction.

The processes described in EP-A 129 195 and 129 196 can be used to prepare the preferred semiaromatic copolyamides with low triamine content.

It is, of course, also possible to use mixtures of the semiaromatic copolyamides, the mixing ratio here being as desired.

The following list, which is not comprehensive, comprises the polyamides A) mentioned and other polyamides A) for the purposes of the invention, and the monomers present:

AB polymers:
PA 4 Pyrrolidone
PA 6 ε-Caprolactam
PA 7 Ethanolactam
PA 8 Caprylolactam
PA 9 9-Aminopelargonic acid
PA 11 11-Aminoundecanoic acid
PA 12 Laurolactam AA/BB polymers:
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA MXD6 m-Xylylenediamine, adipic acid AA/BB polymers:
PA 6I Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA 6I/6T/PACMT as PA 6I/6T+diaminodicyclohexylmethane, terephthalic acid
PA 6T/6I/MACMT as 6I/6T+dimethyldiaminocyclohexylmethane, terephthalic acid
PA 6T/6I/MXDT as PA 6I/6T+m-xylylenediamine, terephthalic acid
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid The inventive molding compositions comprise, as component B), from 0.01 to 50% by weight, preferably from 0.5 to 20% by weight, and in particular from 0.7 to 10% by weight, of B1) at least one highly branched or hyperbranched polycarbonate having an OH number of from 1 to 600 mg KOH/g of polycarbonate, preferably from 10 to 550 mg KOH/g of polycarbonate, and in particular from 50 to 550 mg KOH/g of polycarbonate (to DIN 53240, Part 2) or of at least one hyperbranched polyester as component B2), or a mixture of these as explained below.

For the purposes of this invention, hyperbranched polycarbonates B1) are non-crosslinked macromolecules having hydroxy groups and carbonate groups, these having both structural and molecular nonuniformity. Their structure may firstly be based on a central molecule in the same way as dendrimers, but with nonuniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%. "Dendrimeric" in the context of the present invention means that the degree of branching is from 99.9 to 100%. See H. Frey et al., Acta Polym. 1997, 48, 30 for the definition of "degree of branching".

Component B1) preferably has a number-average molar mass $M_n$ of from 100 to 15 000 g/mol, preferably from 200 to 12 000 g/mol, and in particular from 500 to 10 000 g/mol (GPC, PMMA standard).

The glass transition temperature Tg is in particular from −80 to +140° C., preferably from −60 to 120° C. (according to DSC, DIN 53765).

In particular, the viscosity (mPas) at 23° C. (to DIN 53019) is from 50 to 200 000, in particular from 100 to 150 000, and very particularly preferably from 200 to 100 000.

Component B1) is preferably obtainable via a process which comprises at least the following steps:

a) reaction of at least one organic carbonate (A) of the general formula RO[(CO)O]$_n$R with at least one aliphatic, aliphatic/aromatic, or aromatic alcohol (B) which has at least 3 OH groups, with elimination of alcohols ROH to give one or more condensates (K), where each R, independently of the others, is a straight-chain or branched aliphatic, aromatic/aliphatic, or aromatic hydrocarbon radical having from 1 to 20 carbon atoms, and where the radicals R may also have bonding to one another to form a ring, and n is a whole number from 1 to 5, or ab) reaction of phosgene, diphosgene, or triphosgene with abovementioned alcohol (B) with elimination of hydrogen chloride and b) intermolecular reaction of the condensates (K) to give a high-functionality, highly branched, or high-functionality, hyperbranched polycarbonate, where the quantitative proportion of the OH groups to the carbonates in the reaction mixture is selected in such a way that the condensates (K) have an average of either one carbonate group and more than one OH group or one OH group and more than one carbonate group.

Starting materials which may be used comprise phosphene, diphosgene, or triphosgene, preference being given to organic carbonates.

Each of the radicals R of the organic carbonates (A) used as starting material and having the general formula RO(CO)OR is, independently of the others, a straight-chain or branched aliphatic, aromatic/aliphatic, or aromatic hydrocarbon radical having from 1 to 20 carbon atoms. The two radicals R may also have bonding to one another to form a ring. The radical is preferably an aliphatic hydrocarbon radical, and particularly preferably a straight-chain or branched alkyl radical having from 1 to 5 carbon atoms, or a substituted or unsubstituted phenyl radical.

Use is particularly made of simple carbonates of the formula RO(CO)OR; n is preferably from 1 to 3, in particular 1.

By way of example, dialkyl or diaryl carbonates may be prepared from the reaction of aliphatic, araliphatic, or aromatic alcohols, preferably monoalcohols, with phosgene. They may also be prepared by way of oxidative carbonylation of the alcohols or phenols by means of CO in the presence of noble metals, oxygen, or $NO_x$. In relation to preparation methods for diaryl or dialkyl carbonates, see also "Ullmann's Encyclopedia of Industrial Chemistry", 6th edition, 2000 Electronic Release, Verlag Wiley-VCH.

Examples of suitable carbonates comprise aliphatic, aromatic/aliphatic or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates in which n is greater than 1 comprise dialkyl dicarbonates, such as di(tert-butyl) dicarbonate, or dialkyl tricarbonates, such as di(tert-butyl) tricarbonate.

It is preferable to use aliphatic carbonates, in particular those in which the radicals comprise from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol (B) which has at least 3 OH groups, or with mixtures of two or more different alcohols.

Examples of compounds having at least three OH groups comprise glycerol, trimethylolmethane, trimethylolethane, trimethylolpropane, 1,2,4-butanetriol, tris(hydroxymethyl) amine, tris(hydroxyethyl)amine, tris(hydroxypropyl)amine, pentaerythritol, diglycerol, triglycerol, polyglycerols, bis(trimethylolpropane), tris(hydroxymethyl) isocyanurate, tris (hydroxyethyl) isocyanurate, phloroglucinol, trihydroxytoluene, trihydroxydimethylbenzene, phloroglucides, hexahydroxybenzene, 1,3,5-benzenetrimethanol, 1,1,1-tris (4'-hydroxyphenyl)methane, 1,1,1-tris(4'-hydroxyphenyl) ethane, bis(trimethylolpropane), or sugars, e.g. glucose, trihydric or higher-functionality polyetherols based on trihydric or higher-functionality alcohols and ethylene oxide, propylene oxide, or butylene oxide, or polyesterols. Particular preference is given here to glycerol, trimethylolethane, trimethylolpropane, 1,2,4-butanetriol, pentaerythritol, and their polyetherols based on ethylene oxide or propylene oxide.

These polyhydric alcohols may also be used in a mixture with dihydric alcohols (B'), with the proviso that the average OH functionality of the totality of all of the alcohols used is greater than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxyphenyl, bis(4-bis (hydroxyphenyl) sulfide, bis(4-hydroxyphenyl) sulfone, bis (hydroxymethyl)benzene, bis(hydroxymethyl)toluene, bis (p-hydroxyphenyl)methane, bis(p-hydroxyphenyl)ethane, 2,2-bis(p-hydroxyphenyl)propane, 1,1-bis(p-hydroxyphenyl)cyclohexane, dihydroxybenzophenone, dihydric polyether polyols based on ethylene oxide, propylene oxide, butylene oxide, or their mixtures, polytetrahydrofuran, polycaprolactone, or polyesterols based on diols and dicarboxylic acids.

The diols serve for fine adjustment of the properties of the polycarbonate. If use is made of dihydric alcohols, the ratio of dihydric alcohols B') to the at least trihydric alcohols (B) is set by the person skilled in the art as a function of the desired properties of the polycarbonate. The amount of the alcohol(s) (B') is generally from 0 to 39.9 mol %, based on the entire amount of the totality of all of the alcohols (B) and (B'). The amount is preferably from 0 to 35 mol %, particularly preferably from 0 to 25 mol %, and very particularly preferably from 0 to 10 mol %.

The reaction of phosgene, diphosgene, or triphosgene with the alcohol or alcohol mixture generally takes place with elimination of hydrogen chloride, and the reaction of the carbonates with the alcohol or alcohol mixture to give the inventive high-functionality highly branched polycarbonate takes place with elimination of the monohydric alcohol or phenol from the carbonate molecule.

After the reaction, i.e. without further modification, the high-functionality highly branched polycarbonates formed by the inventive process have termination by hydroxy groups and/or by carbonate groups. They have good solubility in various solvents, e.g. in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

For the purposes of this invention, a high-functionality polycarbonate is a product which, besides the carbonate groups which form the polymer skeleton, further has at least three, preferably at least six, more preferably at least ten, terminal or pendant functional groups. The functional groups are carbonate groups and/or OH groups. There is in principle no upper restriction on the number of the terminal or pendant functional groups, but products having a very high number of functional groups can have undesired properties, such as high viscosity or poor solubility. The high-functionality polycarbonates of the present invention mostly have not more than 500 terminal or pendant functional groups, preferably not more than 100 terminal or pendant functional groups.

When preparing the high-functionality polycarbonates B1), it is necessary to adjust the ratio of the compounds comprising OH groups to phosgene or carbonate in such a way that the simplest resultant condensate (hereinafter termed condensate (K)) comprises an average of either one carbonate group or carbamoyl group and more than one OH group or one OH group and more than one carbonate group or carbamoyl group. The simplest structure of the condensate (K) composed of a carbonate (A) and a di- or polyalcohol (B) here results in the arrangement $XY_n$ or $Y_nX$, where X is a carbonate group, Y is a hydroxy group, and n is generally a number from 1 to 6, preferably from 1 to 4, particularly preferably from 1 to 3. The reactive group which is the single resultant group here is generally termed "focal group" below.

By way of example, if during the preparation of the simplest condensate (K) from a carbonate and a dihydric alcohol the reaction ratio is 1:1, the average result is a molecule of XY type, illustrated by the general formula 1.

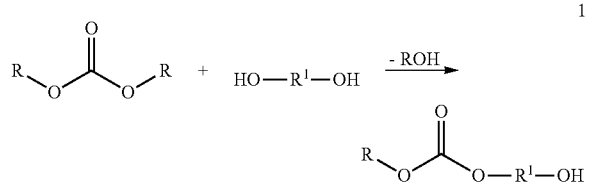

1

During the preparation of the condensate (K) from a carbonate and a trihydric alcohol with a reaction ratio of 1:1, the average result is a molecule of $XY_2$ type, illustrated by the general formula 2. A carbonate group is focal group here.

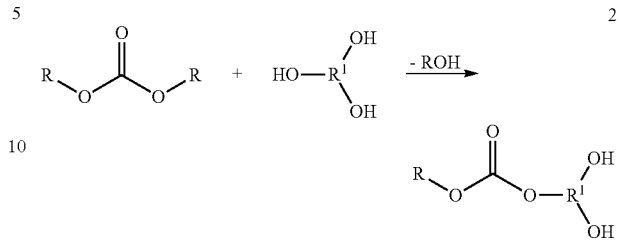

2

During the preparation of the condensate (K) from a carbonate and a tetrahydric alcohol, likewise with the reaction ratio 1:1, the average result is a molecule of $XY_3$ type, illustrated by the general formula 3. A carbonate group is focal group here.

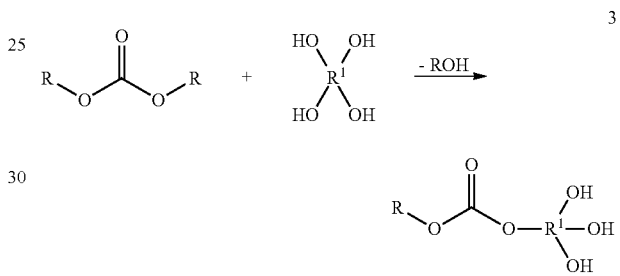

3

R in the formulae 1-3 has the definition given at the outset, and $R^1$ is an aliphatic or aromatic radical.

The condensate (K) may, by way of example, also be prepared from a carbonate and a trihydric alcohol, as illustrated by the general formula 4, the molar reaction ratio being 2:1. Here, the average result is a molecule of $X_2Y$ type, an OH group being focal group here. In formula 4, R and $R^1$ are as defined in formulae 1-3.

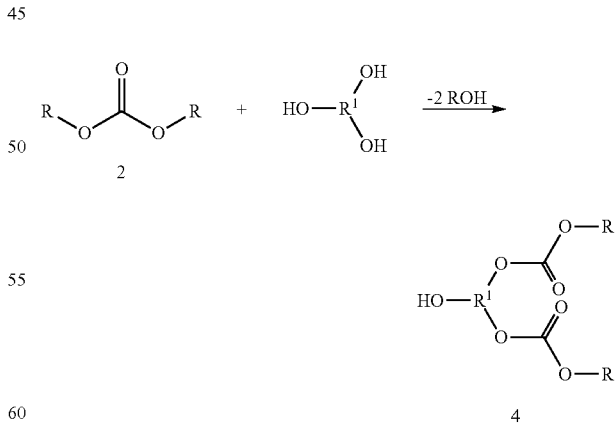

4

If difunctional compounds, e.g. a dicarbonate or a diol, are also added to the components, this extends the chains, as illustrated by way of example in the general formula 5. The average result is again a molecule of $XY_2$ type, a carbonate group being focal group.

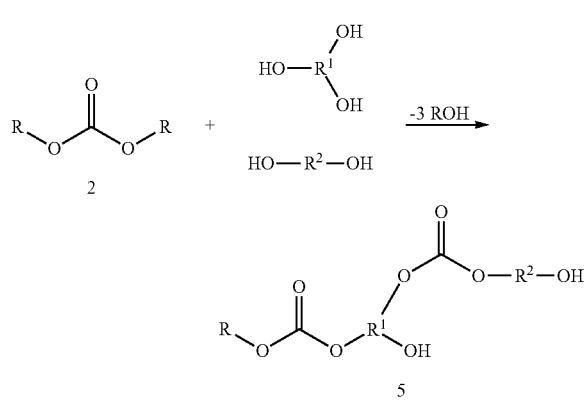

In formula 5, $R^2$ is an organic, preferably aliphatic radical, and R and $R^1$ are as defined above.

It is also possible to use two or more condensates (K) for the synthesis. Firstly, two or more alcohols and, respectively, two or more carbonates may be used here. Furthermore, mixtures of various condensates of different structure can be obtained via the selection of the ratio of the alcohols used and of the carbonates and, respectively, the phosgenes. This will be illustrated taking the example of the reaction of a carbonate with a trihydric alcohol. If the starting materials are used in a ratio of 1:1, as illustrated in (II), the product is an $XY_2$ molecule. If the starting materials are used in a ratio of 2:1, as illustrated in (IV), the product is an $X_2Y$ molecule. If the ratio is between 1:1 and 2:1 the product is a mixture of $XY_2$ and $X_2Y$ molecules.

According to the invention, the simple condensates (K) described by way of example in the formulae 1-5 preferentially react intermolecularly to form high-functionality polycondensates, hereinafter termed polycondensates (P). The reaction to give the condensate (K) and to give the polycondensate (P) usually takes place at a temperature of from 0 to 250° C., preferably from 60 to 160° C., in bulk or in solution. Use may generally be made here of any of the solvents which are inert with respect to the respective starting materials. Preference is given to use of organic solvents, e.g. decane, dodecane, benzene, toluene, chlorobenzene, xylene, dimethylformamide, dimethylacetamide, or solvent naphtha.

In one preferred embodiment, the condensation reaction is carried out in bulk. The phenol or the monohydric alcohol ROH liberated during the reaction can be removed by distillation from the reaction equilibrium to accelerate the reaction, if appropriate at reduced pressure.

If removal by distillation is intended, it is generally advisable to use those carbonates which liberate alcohols ROH with a boiling point below 140° C. during the reaction.

Catalysts or catalyst mixtures may also be added to accelerate the reaction. Suitable catalysts are compounds which catalyze esterification or transesterification reactions, e.g. alkali metal hydroxides, alkali metal carbonates, alkali metal hydrogencarbonates, preferably of sodium, of potassium, or of cesium, tertiary amines, guanidines, ammonium compounds, phosphonium compounds, organoaluminum, organotin, organozinc, organotitanium, organozirconium, or organobismuth compounds, or else what are known as double metal cyanide (DMC) catalysts, e.g. as described in DE 10138216 or DE 10147712.

It is preferable to use potassium hydroxide, potassium carbonate, potassium hydrogencarbonate, diazabicyclooctane (DABCO), diazabicyclononene (DBN), diazabicycloundecene (DBU), imidazoles, such as imidazole, 1-methylimidazole, or 1,2-dimethylimidazole, titanium tetrabutoxide, titanium tetraisopropoxide, dibutyltin oxide, dibutyltin dilaurate, stannous dioctoate, zirconium acetylacetonate, or mixtures thereof.

The amount of catalyst generally added is from 50 to 10 000 ppm by weight, preferably from 100 to 5000 ppm by weight, based on the amount of the alcohol mixture or alcohol used.

It is also possible to control the intermolecular polycondensation reaction via addition of the suitable catalyst or else via selection of a suitable temperature. The average molecular weight of the polymer (P) may moreover be adjusted by way of the composition of the starting components and by way of the residence time.

The condensates (K) and the polycondensates (P) prepared at an elevated temperature are usually stable at room temperature for a relatively long period.

The nature of the condensates (K) permits polycondensates (P) with different structures to result from the condensation reaction, these having branching but no crosslinking. Furthermore, in the ideal case, the polycondensates (P) have either one carbonate group as focal group and more than two OH groups or else one OH group as focal group and more than two carbonate groups. The number of the reactive groups here is the result of the nature of the condensates (K) used and the degree of polycondensation.

By way of example, a condensate (K) according to the general formula 2 can react via triple intermolecular condensation to give two different polycondensates (P), represented in the general formulae 6 and 7.

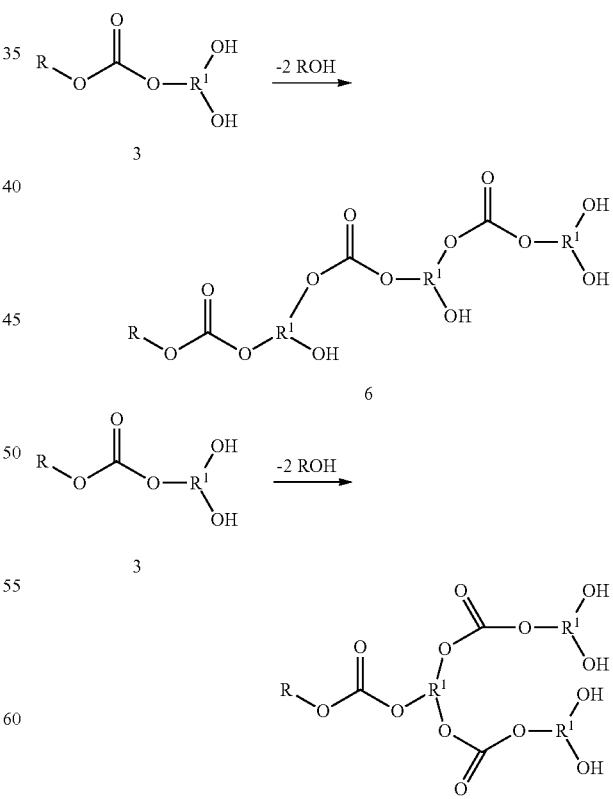

In formula 6 and 7, R and $R^1$ are as defined above.

There are various ways of terminating the intermolecular polycondensation reaction. By way of example, the temperature may be lowered to a range where the reaction stops and the product (K) or the polycondensate (P) is storage-stable.

It is also possible to deactivate the catalyst, for example in the case of basic catalysts via addition of Lewis acids or protonic acids.

In another embodiment, as soon as the intermolecular reaction of the condensate (K) has produced a polycondensate (P) with the desired degree of polycondensation, a product having groups reactive toward the focal group of (P) may be added to the product (P) to terminate the reaction. For example, in the case of a carbonate group as focal group, by way of example, a mono-, di-, or polyamine may be added. In the case of a hydroxy group as focal group, by way of example, a mono-, di-, or polyisocyanate, or a compound comprising epoxy groups, or an acid derivative which reacts with OH groups, can be added to the product (P).

The inventive high-functionality polycarbonates are mostly prepared in the pressure range from 0.1 mbar to 20 bar, preferably at from 1 mbar to 5 bar, in reactors or reactor cascades which are operated batchwise, semicontinuously, or continuously.

The inventive products can be further processed without further purification after their preparation by virtue of the abovementioned adjustment of the reaction conditions and, if appropriate, by virtue of the selection of the suitable solvent.

In another preferred embodiment, the product is stripped, i.e. freed from low-molecular-weight, volatile compounds. For this, once the desired degree of conversion has been achieved the catalyst can optionally be deactivated and the low-molecular-weight volatile constituents, e.g. monoalcohols, phenols, carbonates, hydrogen chloride, or high-volatility oligomers or cyclic compounds can be removed by distillation, if appropriate with introduction of a gas, preferably nitrogen, carbon dioxide, or air, if appropriate at reduced pressure.

In another preferred embodiment, the inventive polycarbonates may acquire other functional groups besides the functional groups acquired by virtue of the reaction. The functionalization may take place during the process to increase molecular weight, or else subsequently, i.e. after completion of the actual polycondensation.

If, prior to or during the process to increase molecular weight, components are added which have other functional groups or functional elements besides hydroxy or carbonate groups, the result is a polycarbonate polymer with randomly distributed functionalities other than the carbonate or hydroxy groups.

Effects of this type can, by way of example, be achieved via addition, during the polycondensation, of compounds which bear other functional groups or functional elements, such as mercapto groups, primary, secondary or tertiary amino groups, ether groups, derivatives of carboxylic acids, derivatives of sulfonic acids, derivatives of phosphonic acids, silane groups, siloxane groups, aryl radicals, or long-chain alkyl radicals, besides hydroxy groups, carbonate groups or carbamoyl groups. Examples of compounds which may be used for modification by means of carbamate groups are ethanolamine, propanolamine, isopropanolamine, 2-(butylamino) ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)-aminomethane, tris(hydroxyethyl)aminomethane, ethylenediamine, propylenediamine, hexamethylenediamine or isophoronediamine.

An example of a compound which can be used for modification with mercapto groups is mercaptoethanol. By way of example, tertiary amino groups can be produced via incorporation of N-methyldiethanolamine, N-methyldipropanolamine or N,N-dimethylethanolamine. By way of example, ether groups may be generated via co-condensation of dihydric or polyhydric polyetherols. Long-chain alkyl radicals can be introduced via reaction with long-chain alkanediols, and reaction with alkyl or aryl diisocyanates generates polycarbonates having alkyl, aryl, and urethane groups or having urea groups.

Addition of dicarboxylic acids or tricarboxylic acids, or, for example, dimethyl terephthalate, or tricarboxylic esters can produce ester groups.

Subsequent functionalization can be achieved by using an additional step of the process (step c)) to react the resultant high-functionality highly branched, or high-functionality hyperbranched polycarbonate with a suitable functionalizing reagent which can react with the OH and/or carbonate groups or carbamoyl groups of the polycarbonate.

By way of example, high-functionality highly branched, or high-functionality hyperbranched polycarbonates comprising hydroxy groups can be modified via addition of molecules comprising acid groups or comprising isocyanate groups. By way of example, polycarbonates comprising acid groups can be obtained via reaction with compounds comprising anhydride groups.

High-functionality polycarbonates comprising hydroxy groups may moreover also be converted into high-functionality polycarbonate polyether polyols via reaction with alkylene oxides, e.g. ethylene oxide, propylene oxide, or butylene oxide.

A great advantage of the process is its cost-effectiveness. Both the reaction to give a condensate (K) or polycondensate (P) and also the reaction of (K) or (P) to give polycarbonates with other functional groups or elements can take place in one reactor, this being advantageous technically and in terms of cost-effectiveness.

The inventive molding compositions may comprise, as component B2), at least one hyperbranched polyester of $A_xB_y$ type, where x is at least 1.1, preferably at least 1.3, in particular at least 2 y is at least 2.1, preferably at least 2.5, in particular at least 3.

Use may also be made of mixtures as units A and/or B, of course.

An $A_xB_y$-type polyester is a condensate composed of an x-functional molecule A and a y-functional molecule B. By way of example, mention may be made of a polyester composed of adipic acid as molecule A (x=2) and glycerol as molecule B (y=3).

For the purposes of this invention, hyperbranched polyesters B2) are noncrosslinked macromolecules having hydroxy groups and carboxy groups, these having both structural and molecular nonuniformity. Their structure may firstly be based on a central molecule in the same way as dendrimers, but with nonuniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%.

"Dendrimeric" in the context of the present invention means that the degree of branching is from 99.9 to 100%. See H. Frey et al., Acta Polym. 1997, 48, 30 for the definition of "degree of branching".

Component B2) preferably has an $M_n$ of from 300 to 30 000 g/mol, in particular from 400 to 25 000 g/mol, and very particularly from 500 to 20 000 g/mol, determined by means of GPC, PMMA standard, dimethylacetamide eluent.

B2) preferably has an OH number of from 0 to 600 mg KOH/g of polyester, preferably of from 1 to 500 mg KOH/g of polyester, in particular from 20 to 500 mg KOH/g of polyester to DIN 53240, and preferably a COOH number of from 0 to 600 mg KOH/g of polyester, preferably from 1 to 500 mg KOH/g of polyester, and in particular from 2 to 500 mg KOH/g of polyester.

The $T_g$ is preferably from −50° C. to 140° C., and in particular from −50 to 100° C. (by means of DSC, to DIN 53765).

Preference is particularly given to those components B2) in which at least one OH or COOH number is greater than 0, preferably greater than 0.1, and in particular greater than 0.5.

The inventive component B2) is in particular obtainable via the processes described below, inter alia by reacting (a) one or more dicarboxylic acids or one or more derivatives of the same with one or more at least trihydric alcohols
or
(b) one or more tricarboxylic acids or higher polycarboxylic acids or one or more derivatives of the same with one or more diols in the presence of a solvent and optionally in the presence of an inorganic, organometallic, or low-molecular-weight organic catalyst, or of an enzyme. The reaction in solvent is the preferred preparation method.

For the purposes of the present invention, high-functionality hyperbranched polyesters B2) have molecular and structural nonuniformity. Their molecular nonuniformity distinguishes them from dendrimers, and they can therefore be prepared at considerably lower cost.

Among the dicarboxylic acids which can be reacted according to variant (a) are, by way of example, oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid, and the abovementioned dicarboxylic acids may have substitution by one or more radicals selected from $C_1$-$C_{10}$-alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl groups, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl;

alkylene groups, such as methylene or ethylidene, or $C_6$-$C_{14}$-aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, particularly preferably phenyl.

Examples which may be mentioned of representatives of substituted dicarboxylic acids are: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

Among the dicarboxylic acids which can be reacted according to variant (a) are also ethylenically unsaturated acids, such as maleic acid and fumaric acid, and aromatic dicarboxylic acids, such as phthalic acid, isophthalic acid or terephthalic acid.

It is also possible to use mixtures of two or more of the abovementioned representative compounds.

The dicarboxylic acids may either be used as they stand or be used in the form of derivatives.

Derivatives are preferably
the relevant anhydrides in monomeric or else polymeric form,
mono- or dialkyl esters, preferably mono- or dimethyl esters, or the corresponding mono- or diethyl esters, or else the mono- and dialkyl esters derived from higher alcohols, such as n-propanol, isopropanol, n-butanol, isobutanol, tert-butanol, n-pentanol, n-hexanol,
and also mono- and divinyl esters, and
mixed esters, preferably methyl ethyl esters.

In the preferred preparation process it is also possible to use a mixture composed of a dicarboxylic acid and one or more of its derivatives. Equally, it is possible to use a mixture of two or more different derivatives of one or more dicarboxylic acids.

It is particularly preferable to use succinic acid, glutaric acid, adipic acid, phthalic acid, isophthalic acid, terephthalic acid, or the mono- or dimethyl ester thereof. It is very particularly preferable to use adipic acid.

Examples of at least trihydric alcohols which may be reacted are: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylolpropane, trimethylolethane, pentaerythritol or dipentaerythritol; sugar alcohols, such as mesoerythritol, threitol, sorbitol, mannitol, or mixtures of the above at least trihydric alcohols. It is preferable to use glycerol, trimethylolpropane, trimethylolethane, and pentaerythritol.

Examples of tricarboxylic acids or polycarboxylic acids which can be reacted according to variant (b) are benzene-1,2,4-tricarboxylic acid, benzene-1,3,5-tricarboxylic acid, benzene-1,2,4,5-tetracarboxylic acid, and mellitic acid.

Tricarboxylic acids or polycarboxylic acids may be used in the inventive reaction either as they stand or else in the form of derivatives.

Derivatives are preferably
the relevant anhydrides in monomeric or else polymeric form,
mono-, di-, or trialkyl esters, preferably mono-, di-, or trimethyl esters, or the corresponding mono-, di-, or triethyl esters, or else the mono-, di-, and triesters derived from higher alcohols, such as n-propanol, isopropanol, n-butanol, isobutanol, tert-butanol, n-pentanol, n-hexanol, or else mono-, di-, or trivinyl esters
and mixed methyl ethyl esters.

For the purposes of the present invention, it is also possible to use a mixture composed of a tri- or polycarboxylic acid and one or more of its derivatives. For the purposes of the present invention it is likewise possible to use a mixture of two or more different derivatives of one or more tri- or polycarboxylic acids, in order to obtain component B2).

Examples of diols used for variant (b) of the present invention are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, (2)-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H or mixtures of two or more representative compounds of the above compounds, where n is a whole number and n=from 4 to 25. One, or else both, hydroxy groups here in the abovementioned diols may also be substituted by SH groups. Preference is given to ethylene glycol, propane-1,2-diol, and diethylene glycol, triethylene glycol, dipropylene glycol, and tripropylene glycol.

The molar ratio of the molecules A to molecules B in the $A_xB_y$ polyester in the variants (a) and (b) is from 4:1 to 1:4, in particular from 2:1 to 1:2.

The at least trihydric alcohols reacted according to variant (a) of the process may have hydroxy groups of which all have identical reactivity. Preference is also given here to at least trihydric alcohols whose OH groups initially have identical reactivity, but where reaction with at least one acid group can induce a fall-off in reactivity of the remaining OH groups as a result of steric or electronic effects. By way of example, this applies when trimethylolpropane or pentaerythritol is used.

However, the at least trihydric alcohols reacted according to variant (a) may also have hydroxy groups having at least two different chemical reactivities.

The different reactivity of the functional groups here may either derive from chemical causes (e.g. primary/secondary/tertiary OH group) or from steric causes.

By way of example, the triol may comprise a triol which has primary and secondary hydroxy groups, preferred example being glycerol.

When the inventive reaction is carried out according to variant (a), it is preferable to operate in the absence of diols and monohydric alcohols.

When the inventive reaction is carried out according to variant (b), it is preferable to operate in the absence of mono- or dicarboxylic acids.

The inventive process is carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents in the absence of acidic catalysts are: ethers, such as dioxane or tetrahydrofuran, and ketones, such as methyl ethyl ketone and methyl isobutyl ketone.

According to the invention, the amount of solvent added is at least 0.1% by weight, based on the weight of the starting materials used and to be reacted, preferably at least 1% by weight, and particularly preferably at least 10% by weight. It is also possible to use excesses of solvent, based on the weight of starting materials used and to be reacted, e.g. from 1.01 to 10 times the amount. Solvent amounts of more than 100 times the weight of the starting materials used and to be reacted are not advantageous, because the reaction rate reduces markedly at markedly lower concentrations of the reactants, giving uneconomically long reaction times.

To carry out the process preferred according to the invention, operations may be carried out in the presence of a dehydrating agent as additive, added at the start of the reaction. Suitable examples are molecular sieves, in particular 4 Å molecular sieve, $MgSO_4$, and $Na_2SO_4$. During the reaction it is also possible to add further dehydrating agent or to replace dehydrating agent by fresh dehydrating agent. During the reaction it is also possible to remove the water or alcohol formed by distillation and, for example, to use a water separator.

The process may be carried out in the absence of acidic catalysts. It is preferable to operate in the presence of an acidic inorganic, organometallic, or organic catalyst, or a mixture composed of two or more acidic inorganic, organometallic, or organic catalysts.

For the purposes of the present invention, examples of acidic inorganic catalysts are sulfuric acid, phosphoric acid, phosphonic acid, hypophosphorous acid, aluminum sulfate hydrate, alum, acidic silica gel (pH=6, in particular =5), and acidic aluminum oxide. Examples of other compounds which can be used as acidic inorganic catalysts are aluminum compounds of the general formula $Al(OR)_3$ and titanates of the general formula $Ti(OR)_4$, where each of the radicals R may be identical or different and is selected independently of the others from $C_1$-$C_{10}$-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl radicals, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl.

Each of the radicals R in $Al(OR)_3$ or $Ti(OR)_4$ is preferably identical and selected from isopropyl or 2-ethylhexyl.

Examples of preferred acidic organometallic catalysts are selected from dialkyltin oxides $R_2SnO$, where R is defined as above. A particularly preferred representative compound for acidic organometallic catalysts is di-n-butyltin oxide, which is commercially available as "oxo-tin", or di-n-butyltin dilaurate.

Preferred acidic organic catalysts are acidic organic compounds having, by way of example, phosphate groups, sulfonic acid groups, sulfate groups, or phosphonic acid groups. Particular preference is given to sulfonic acids, such as para-toluenesulfonic acid. Acidic ion exchangers may also be used as acidic organic catalysts, e.g. polystyrene resins comprising sulfonic acid groups and crosslinked with about 2 mol % of divinylbenzene.

It is also possible to use combinations of two or more of the abovementioned catalysts. It is also possible to use an immobilized form of those organic or organometallic, or else inorganic catalysts which take the form of discrete molecules.

If the intention is to use acidic inorganic, organometallic, or organic catalysts, according to the invention the amount used is from 0.1 to 10% by weight, preferably from 0.2 to 2% by weight, of catalyst.

The inventive process is carried out under inert gas, e.g. under carbon dioxide, nitrogen, or a noble gas, among which mention may particularly be made of argon.

The inventive process is carried out at temperatures of from 60 to 200° C. It is preferable to operate at temperatures of from 130 to 180° C., in particular up to 150° C., or below that temperature. Maximum temperatures up to 145° C. are particularly preferred, and temperatures up to 135° C. are very particularly preferred.

The pressure conditions for the inventive process are not critical per se. It is possible to operate at markedly reduced pressure, e.g. at from 10 to 500 mbar. The inventive process may also be carried out at pressures above 500 mbar. A reaction at atmospheric pressure is preferred for reasons of simplicity; however, conduct at slightly increased pressure is also possible, e.g. up to 1200 mbar. It is also possible to operate at markedly increased pressure, e.g. at pressures up to 10 bar. Reaction at atmospheric pressure is preferred.

The reaction time for the inventive process is usually from 10 minutes to 25 hours, preferably from 30 minutes to 10 hours, and particularly preferably from one to 8 hours.

Once the reaction has ended, the high-functionality hyperbranched polyesters can easily be isolated, e.g. by removing the catalyst by filtration and concentrating the mixture, the concentration process here usually being carried out at reduced pressure. Other work-up methods with good suitability are precipitation after addition of water, followed by washing and drying.

Component B2) can also be prepared in the presence of enzymes or decomposition products of enzymes (according to DE-A 101 63163). For the purposes of the present invention, the term acidic organic catalysts does not include the dicarboxylic acids reacted according to the invention.

It is preferable to use lipases or esterases. Lipases and esterases with good suitability are *Candida cylindracea, Candida lipolytica, Candida rugosa, Candida antarctica, Candida utilis, Chromobacterium viscosum, Geolrichum viscosum, Geotrichum candidum, Mucor javanicus, Mucor mihei*, pig pancreas, *pseudomonas* spp., *pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii*, or esterases from *Bacillus* spp. and *Bacillus thermoglucosidasius*. *Candida antarctica* lipase B is particularly preferred. The enzymes listed are commercially available, for example from Novozymes Biotech Inc., Denmark.

The enzyme is preferably used in immobilized form, for example on silica gel or Lewatit®. Processes for immobilizing enzymes are known per se, e.g. from Kurt Faber, "Biotransformations in organic chemistry", 3rd edition 1997, Springer Verlag, Chapter 3.2 "Immobilization" pp. 345-356. Immobilized enzymes are commercially available, for example from Novozymes Biotech Inc., Denmark.

The amount of immobilized enzyme used is from 0.1 to 20% by weight, in particular from 10 to 15% by weight, based on the total weight of the starting materials used and to be reacted.

The inventive process is carried out at temperatures above 60° C. It is preferable to operate at temperatures of 100° C. or below that temperature. Preference is given to temperatures up to 80° C., very particular preference is given to temperatures of from 62 to 75° C., and still more preference is given to temperatures of from 65 to 75° C.

The inventive process is carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents are: ethers, such as dioxane or tetrahydrofuran, and ketones, such as methyl ethyl ketone and methyl isobutyl ketone.

The amount of solvent added is at least 5 parts by weight, based on the weight of the starting materials used and to be reacted, preferably at least 50 parts by weight, and particularly preferably at least 100 parts by weight. Amounts of more than 10 000 parts by weight of solvent are undesirable, because the reaction rate decreases markedly at markedly lower concentrations, giving uneconomically long reaction times.

The inventive process is carried out at pressures above 500 mbar. Preference is given to the reaction at atmospheric pressure or slightly increased pressure, for example at up to 1200 mbar. It is also possible to operate under markedly increased pressure, for example at pressures up to 10 bar. The reaction at atmospheric pressure is preferred.

The reaction time for the inventive process is usually from 4 hours to 6 days, preferably from 5 hours to 5 days, and particularly preferably from 8 hours to 4 days.

Once the reaction has ended, the high-functionality hyperbranched polyesters can be isolated, e.g. by removing the enzyme by filtration and concentrating the mixture, the concentration process here usually being carried out at reduced pressure. Other work-up methods with good suitability are precipitation after addition of water, followed by washing and drying.

The high-functionality, hyperbranched polyesters obtainable by the inventive process feature particularly low contents of discolored and resinified material. For the definition of hyperbranched polymers, see also: P. J. Flory, J. Am. Chem. Soc. 1952, 74, 2718, and A. Sunder et al., Chem. Eur. J. 2000, 6, no. 1, 1-8. However, in the context of the present invention, "high-functionality hyperbranched" means that the degree of branching, i.e. the average number of dendritic linkages plus the average number of end groups per molecule is from 10 to 99.9%, preferably from 20 to 99%, particularly preferably from 30 to 90% (see in this connection H. Frey et al. Acta Polym. 1997, 48, 30).

The inventive polyesters have a molar mass $M_w$ of from 500 to 50 000 g/mol, preferably from 1000 to 20 000 g/mol, particularly preferably from 1000 to 19 000 g/mol. The polydispersity is from 1.2 to 50, preferably from 1.4 to 40, particularly preferably from 1.5 to 30, and very particularly preferably from 1.5 to 10. They are usually very soluble, i.e. clear solutions can be prepared using up to 50% by weight, in some cases even up to 80% by weight, of the inventive polyesters in tetrahydrofuran (THF), n-butyl acetate, ethanol, and numerous other solvents, with no gel particles detectable by the naked eye.

The inventive high-functionality hyperbranched polyesters are carboxy-terminated, carboxy- and hydroxy-terminated, and preferably hydroxy-terminated.

The ratios of the components B1):B2) are preferably from 1:20 to 20:1, in particular from 1:15 to 15:1, and very particularly from 1:5 to 5:1 when used in a mixture.

The inventive molding compositions may comprise, as component C), from 0 to 60% by weight, in particular up to 50% by weight, of other additives and processing aids.

The inventive molding compositions may comprise, as component C), from 1 to 5000 ppm, preferably from 10 to 1000 ppm, and in particular from 50 to 500 ppm, of a Cu(I) salt, preferably of a Cu(I) halide, in particular in a mixture with an alkali metal halide, preferably KI.

The monovalent copper salts used preferably comprise copper(I) acetate, copper(I) chloride, copper(I) bromide, and copper(I) iodide. Their amounts present correspond to from 5 to 500 ppm of copper, preferably from 10 to 250 ppm, based on polyamide.

The advantageous properties are in particular obtained if the copper has molecular dispersion within the polyamide. This is achieved by adding, to the molding composition, a concentrate comprising the polyamide and comprising a monovalent copper salt and comprising an alkali metal halide in the form of a solid, homogeneous solution. By way of example, a typical concentrate is composed of from 79 to 95% by weight of polyamide and from 21 to 5% by weight of a mixture composed of copper iodide or copper bromide and potassium iodide. The concentration of copper in the solid homogeneous solution is preferably from 0.3 to 3% by weight, in particular from 0.5 to 2% by weight, based on the total weight of the solution, and the molar ratio of copper(I) iodide to potassium iodide is from 1 to 11.5, preferably from 1 to 5.

Suitable polyamides for the concentrate are homopolyamides and copolyamides, in particular nylon-6 and nylon-6,6.

The inventive molding compositions may comprise, as component C), from 0 to 5% by weight, preferably from 0.05 to 3% by weight, and in particular from 0.1 to 2% by weight, of at least one ester or amide of saturated or unsaturated aliphatic carboxylic acids having from 10 to 40, preferably from 16 to 22, carbon atoms with aliphatic saturated alcohols or amines having from 2 to 40, preferably from 2 to 6, carbon atoms.

The carboxylic acids may be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines may be mono-, di- or triamines. Examples of these are stearylamine, ethylenediamine, propylenediamine, hexamethylenediamine, di(6-aminohexyl) amine, particular preference being given to ethylenediamine and hexamethylenediamine. Correspondingly, preferred esters or amides are glyceryl distearate, glyceryl tristearate, ethylenediamine distearate, glyceryl monopalmitate, glyceryl trilaurate, glyceryl monobehenate, and pentaerythrityl tetrastearate.

It is also possible to use mixtures of various esters or amides, or esters with amides combined, the mixing ratio here being as desired.

Examples of amounts of other usual additives C) are up to 40% by weight, preferably up to 30% by weight, of elastomeric polymers (also often termed impact modifiers, elastomers, or rubbers).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I, II, III or IV

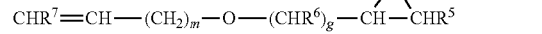

where $R^1$ to $R^9$ are hydrogen or alkyl groups having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

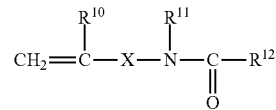

where:
$R^{10}$ is hydrogen or $C_1$-$C_4$-alkyl,
$R^{11}$ is hydrogen or $C_1$-$C_8$-alkyl or aryl, in particular phenyl,
$R^{12}$ is hydrogen, $C_1$-$C_{10}$-alkyl, $C_6$-$C_{12}$-aryl or —$OR^{13}$
$R^{13}$ is $C_1$-$C_8$-alkyl or $C_6$-$C_{12}$-aryl, if desired with substitution by O- or N-comprising groups,
X is a chemical bond or $C_1$-$C_{10}$-alkylene or $C_6$-$C_{12}$-arylene, or

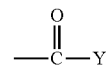

Y is O—Z or NH—Z, and
Z is $C_1$-$C_{10}$-alkylene or $C_6$-$C_{12}$-arylene.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymers.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or from copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the above-mentioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

Fibrous or particulate fillers C) which may be mentioned are carbon fibers, glass fibers, glass beads, amorphous silica, calcium silicate, calcium metasilicate, magnesium carbonate, kaolin, chalk, powdered quartz, mica, barium sulfate and feldspar, used in amounts of up to 50% by weight, in particular up to 40% by weight.

Preferred fibrous fillers which may be mentioned are carbon fibers, aramid fibers and potassium titanate fibers, and particular preference is given to glass fibers in the form of E glass. These may be used as rovings or in the commercially available forms of chopped glass.

The fibrous fillers may have been surface-pretreated with a silane compound to improve compatibility with the thermoplastic.

Suitable silane compounds have the general formula:

where:
X is $NH_2—$,

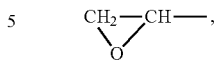

$HO—$, n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.05 to 5% by weight, preferably from 0.5 to 1.5% by weight and in particular from 0.8 to 1% by weight (based on C).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if appropriate, have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

As component C), the thermoplastic molding compositions of the invention may comprise usual processing aids, such as stabilizers, oxidation retarders, agents to counteract decomposition due to heat and decomposition due to ultraviolet light, lubricants and mold-release agents, colorants, such as dyes and pigments, nucleating agents, plasticizers, flame retardants, etc.

Examples which may be mentioned of oxidation retarders and heat stabilizers are sterically hindered phenols and/or phosphites and amines (e.g. TAD), hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants which may be added are inorganic pigments, such as titanium dioxide, ultramarine blue, iron oxide, and carbon black, and also organic pigments, such as phthalocyanines, quinacridones and perylenes, and also dyes, such as nigrosine and anthraquinones.

Nucleating agents which may be used are sodium phenylphosphinate, alumina, silica, and preferably talc.

Other lubricants and mold-release agents are usually used in amounts of up to 1% by weight. Preference is given to long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), or calcium montanate or sodium montanate, or low-molecular-weight polyethylene waxes or low-molecular-weight polypropylene waxes.

The inventive thermoplastic molding compositions may be prepared by methods known per se, by mixing the starting components in conventional mixing apparatus, such as screw extruders, Brabender mixers or Banbury mixers, and then extruding them. The extrudate may then be cooled and comminuted. It is also possible to premix individual components and then to add the remaining starting materials individually and/or likewise in a mixture. The mixing temperatures are generally from 230 to 320° C.

In another preferred procedure, components B) and, if appropriate, C) may be mixed with a prepolymer, compounded, and pelletized. The resultant pellets are then solid-phase condensed under an inert gas, continuously or batchwise, at a temperature below the melting point of component A) until the desired viscosity has been reached.

The inventive thermoplastic molding compositions feature good flowability together with good mechanical properties.

In particular, the individual components can be processed without difficulty (without clumping or caking) and in short cycle times, so that a particular possible application thereof is thin-wall components.

Improved-flow polyamides could be used in almost any injection-molding application. Improved flow allows lower melt temperature and can therefore lead to a marked reduction in the overall cycle time for injection molding (reduction in production costs for an injection molding!). Furthermore, the injection pressures needed during processing are lower, thus requiring lower total locking force on the injection mold (less capital expenditure on the injection-molding machine).

Alongside the improvements in the injection-molding process, lowering of melt viscosity can lead to significant advantages in the actual design of the component. For example, injection molding can be used to produce thin-walled applications which, by way of example, were not hitherto capable of production using filled grades of polyamide. Similarly, by using grades of polyamide which are reinforced but relatively free-flowing could reduce wall thicknesses in existing applications, and therefore reduce component weight.

These materials are suitable for production of fibers, foils, or moldings of any type. Some examples are given below:

Improved-flow polyamides can be used in the electrical and electronics sector to produce plugs, plug components, plug connectors, cable harness components, circuit mounts, circuit-mount components, three-dimensionally injection-molded circuit mounts, electrical connector elements, or mechatronic components.

Possible uses in automobile interiors are dashboards, steering-column switches, seat components, headrests, center consoles, gearbox components, and door modules, and possible uses in automobile exteriors are door handles, exterior-mirror components, windshield-washer components, windshield-washer protective housings, grills, roof rails, sunroof frames, engine covers, cylinder-head covers, inlet manifolds, windshield wipers, and exterior bodywork parts.

In the kitchen and household sector, improved-flow polyamides can be used to produce components for kitchen machines, e.g. fryers, smoothing irons, buttons, and applications in the garden and leisure sector, e.g. components for irrigation systems or garden machines, and door handles.

EXAMPLES

The following components were used:
Component A/1:
Nylon-6 (polycaprolactam) with a viscosity number VN of 150 ml/g, measured in the form of a 0.5% strength by weight solution in 96% strength by weight sulfuric acid at 25° C. to ISO 307 (the material used being Ultramid® B3 from BASF AG).
Component A/2:
Nylon-6T/6 (70:30) with a viscosity number VN of 135 ml/g, measured in the form of a 0.5% strength by weight solution in 96% strength by weight sulfuric acid at 25° C. to ISO 307 (the material used being Ultramid® KTR 4350 from BASF AG).
Component B
Polycarbonates B1
General Operating Specification:

The polyhydric alcohol, diethyl carbonate, and catalyst (250 ppm, based on weight of alcohol) were used as initial charge in a three-necked flask equipped with stirrer, reflux condenser, and internal thermometer, the amounts in the mixture being as in table 1, and the mixture was heated to 120° C. and stirred at this temperature for 2 h. The temperature of the reaction mixture reduced here as the reaction proceeded, because of onset of evaporative cooling by the ethanol liberated. The reflux condenser was then replaced by an inclined condenser and, based on the equivalent amount of catalyst, one equivalent of phosphoric acid was added, the ethanol was removed by distillation, and the temperature of the reaction mixture was increased slowly to 160° C.

The alcohol removed by distillation was collected in a cooled round-bottomed flask and weighed, and conversion was thus determined and compared in percentage terms with the full conversion theoretically possible (see table 1).

The reaction products were then analyzed by gel permeation chromatography, using dimethylacetamide as eluent and polymethyl methacrylate (PMMA) as standard.

Glass transition temperature and, respectively, melting point were determined by DSC (differential scanning calorimetry) to ASTM 3418/82, evaluating the second heating curve.

TABLE 1

| Comp. | Alcohol | Alcohol:Diethyl carbonate molar ratio | Catalyst | Distillate, amount of alcohol, based on full conversion Mol % | Molar mass of product (g/mol) Mw Mn | Visc. of product at 23° C. (mPas) | OH number of product to DIN 53240, Part 2 (mg KOH/g) |
|---|---|---|---|---|---|---|---|
| B 1/1 | TMP × 3 EO | 1:1 | $K_2CO_3$ | 90 | 4600 2600 | 5030 | 310 |
| B 1/2 | TMP × 1.2 PO | 1:1 | $K_2CO_3$ | 90 | 2800 1800 | 37 000 | 436 |

TABLE 1-continued

| Comp. | Alcohol | Alcohol:Diethyl carbonate molar ratio | Catalyst | Distillate, amount of alcohol, based on full conversion Mol % | Molar mass of product (g/mol) Mw Mn | Visc. of product at 23° C. (mPas) | OH number of product to DIN 53240, Part 2 (mg KOH/g) |
|---|---|---|---|---|---|---|---|
| B 1/3 | TMP × 12 EO | 1:1 | KOH | 70 | 4400 2500 | 550 | 180 |
| B 1/4 | TMP × 5.4 PO | 1:1 | KOH | 85 | 4000 1700 | 1900 | 228 |

TMP = Trimethylolpropane
EO = Ethylene oxide
PO = Propylene oxide

Component B 2/1

2001 g (13 mol) of cyclohexane-1,2-dicarboxylic anhydride and 997 g (10.8 mol) of glycerol were used as initial charge in a 4 l jacketed reactor equipped with stirrer, internal thermometer, gas-inlet tube, reflux condenser, and vacuum connection with cold trap. After addition of 3 g of di-n-butyltin oxide, the mixture was heated to an internal temperature of 150° C. with the aid of an oil bath. A reduced pressure of 140 mbar was applied in order to remove water formed during the reaction. The reaction mixture was kept at the stated temperature and the stated pressure for 12 hours. Cooling to room temperature gave the solid polyester. The analytical data are given in table 2.

Component B 2/2

60 g (0.41 mol) of adipic acid and 89 g (0.34 mol) of tris(hydroxyethyl) isocyanurate (THEIC) were used as initial charge in a 250 ml four-necked glass flask equipped with stirrer, internal thermometer, gas-inlet tube, reflux condenser and vacuum connection with cold trap. After addition of 0.3 ml of sulfuric acid (2% aqueous solution), the mixture was heated to an internal temperature of from 125 to 135° C. with the aid of an oil bath. A reduced pressure of from 100 to 180 mbar was applied in order to remove water formed during the reaction. The reaction mixture was kept at the stated temperature and the stated pressure for 10 hours. A further 68.2 g (0.26 mol) of THEIC were then added and the reaction was kept for a further 4 hours at the stated temperature and the stated pressure. Cooling to room temperature gave the solid polyester. The analytical data are given in table 2.

Component B 2/3

116.5 g (0.6 mol) of dimethyl terephthalate (DMT) and 335 g (0.5 mol) of ethoxylated tris(hydroxymethyl)propane, molar mass 670 g/mol, were used as initial charge in a 1 l reaction vessel equipped with stirrer, internal thermometer, gas-inlet tube, reflux condenser, and vacuum connection with cold trap. After addition of 0.45 g of di-n-butyltin oxide, the mixture was heated to an internal temperature of from 150 to 155° C. with the aid of an oil bath, at a reduced pressure of 140 mbar. Methanol formed during the reaction was removed by distillation. The reaction mixture was kept at the stated temperature and the stated pressure for 3 hours. Cooling to room temperature gave the polyester in the form of a clear, low-viscosity liquid. The analytical data are given in table 2.

TABLE 2

| No. | Mn (g/mol) | Mw (g/mol) | Tg (° C.) | Acid number (mg KOH/g) | Hydroxy number (mg KOH/g) | Viscosity (mPa·s) |
|---|---|---|---|---|---|---|
| B 2/1 | 1280 | 3310 | 26.5 | 141 | 268 | 700@150° C. |
| B 2/2 | 4160 | 23 770 | n.d. | n.d. | n.d. | 5000@50° C. |
| B 2/3 | 1130 | 3030 | 15.4 | 37 | 369 | 6400@100° C. | n.d. = not determined

Analysis of Inventive Polyesters

The polyesters were analyzed by gel permeation chromatography, using a refractometer as detector. The mobile phase used was tetrahydrofuran and the standard used to determine molecular weight was polymethyl methacrylate (PMMA).

Glass transition temperatures were determined by differential scanning calorimetry (DSC) evaluating the second heating curve. Acid number and hydroxy number were determined to DIN 53240, Part 2.

Preparation of Molding Compositions for Constitutions with A/1

Components A) and B) were blended at from 250 to 260° C. in a twin-screw extruder and extruded into a water bath. After pelletization and drying, VN and MVR were determined on the pellets.

Preparation of Molding Compositions for A/2

Components A) and B) were blended at from 320 to 330° C. in a twin-screw extruder and extruded into a water bath. After pelletization and drying, VN and MVR were determined on the pellets MVR was determined to ISO 11 33 (at 275° C., melting time: 8 min, 5 kg), and for A/2 at 325° C., melting time: 4 min., and 5 kg, and VN was determined to ISO 307 (at c=5 g/l in 96% strength sulfuric acid).

The variables E, σ, ε, ak, and an were measured to ISO 527 and 179 1eA, and also 179 1 eV.

The inventive constitutions and the results of the measurements are found in tables 3 to 5.

TABLE 3

| | Component A/1 [% by weight] | Component B [% by weight] | VN [ml/g] | MVR [ml/10 min] |
|---|---|---|---|---|
| Comparison | 100 | 0 | 150 | 131 |
| Ex. 1 | 96 | 4% B 1/1 | 144 | 236 |
| Ex. 2 | 99 | 1% B 1/2 | 148 | 203 |
| Ex. 3 | 98 | 2% B 1/3 | 149 | 193 |
| Ex. 4 | 99 | 1% B 2/1 | 144 | 272 |
| Ex. 5 | 99 | 1% B 2/2 | 144 | 197 |
| Ex. 6 | 99 | 1% B 2/3 | 147 | 208 |

TABLE 4

| | Component A/2 [% by weight] | Component B [% by weight] | VN [ml/g] | MVR [ml/10 min] |
|---|---|---|---|---|
| Comparison | 100 | 0 | 126 | 52.3 |
| Ex. 1 | 99 | 1% B 1/2 | 123 | 67.4 |
| Ex. 2 | 98 | 2% B 1/2 | 123 | 82.8 |
| Ex. 3 | 99 | 1% B 1/4 | 126 | 55.4 |
| Ex. 4 | 98 | 2% B 1/4 | 122 | 77.2 |

TABLE 5

|  | Component A/2 [% by wt.] | Component B [% by wt.] | Flow spiral 80/330 cm | Flow spiral 100/330 cm | E MPa | σ MPa | ε % | ak kJ/m² | an kJ/m² |
|---|---|---|---|---|---|---|---|---|---|
| Comparison | 100 | 0 | 42 | 46 | 3170 | 95 | 3.9/— | 8.8 | 171 |
| Ex. 1 | 99 | 1% B 1/2 | 46 | 49 | 3160 | 94 | 3.6/5.1 | 8.8 | 276 |
| Ex. 2 | 98 | 2% B 1/2 | 50 | 52.5 | 3200 | 95 | 4.2/5.1 | 8.4 | 211 |
| Ex. 3 | 99 | 1% B 1/4 | 45.5 | 49 | 3120 | 95 | 4.4/5.2 | 9.3 | 137 |
| Ex. 4 | 98 | 2% B 1/4 | 48.5 | 59 | 3170 | 90 | 3.7/3.7 | 8.8 | 46 |

80/330 Mold Temperature/Product Temperature

The invention claimed is:

1. A thermoplastic molding composition, comprising:
   A) from 10 to 99% by weight of at least one thermoplastic polyamide,
   B) from 0.01 to 50% by weight of
   B1) at least one hyperbranched polycarbonate with an OH number of from 1 to 600 mg KOH/g of polycarbonate (DIN 53240, Part 2) and having a degree of branching of 10 to 99.9% and a glass transition temperature Tg of from −80° C. to 140° C., or
   B2) at least one hyperbranched polyester of $A_xB_y$ type with an OH number of from 1 to 600 mg KOH/g of polyester (DIN 53240) and having a degree of branching of 10 to 99.9%, where x is at least 1.1 and y is at least 2.1, or a mixture of these, having a polydispersity of 1.2 to 50 and a molar mass $M_w$ of 1000 to 20,000 g/mol, and
   C) from 0 to 60% by weight of other additives,
   wherein the total of the percentages by weight of components A) to C) is 100%.

2. The thermoplastic molding composition according to claim 1, wherein component B) comprises component B1) and component B1) has a number-average molar mass Mn of from 100 to 15 000 g/mol.

3. The thermoplastic molding composition according to claim 1, wherein component B) comprises component B1).

4. The thermoplastic molding composition according to claim 1, wherein component B) comprises component B1) and component B1) has a viscosity (mPas) at 23° C. (DIN 53019) of from 50 to 200 000.

5. The thermoplastic molding composition according claim 1, wherein component B) comprises component B2) and component B2) has a number-average molar mass Mn of from 300 to 30 000 g/mol.

6. The thermoplastic molding composition according to claim 1, wherein component B) comprises component B2) and B2) has a glass transition temperature Tg of from −50 to 140° C.

7. The thermoplastic molding composition according claim 1, wherein component B) comprises component B2) and B2) has an OH number (DIN 53240) of from 1 to 500 mg KOH/g of polyester.

8. The thermoplastic molding composition according to claim 1, wherein component B) comprises component B2) and B2) has a COOH number (DIN 53240) of from 0 to 600 mg KOH/g of polyester.

9. The thermoplastic molding composition according to claim 1, wherein component B2) has at least one OH number or COOH number greater than 0.

10. The thermoplastic molding composition according to claim 1, wherein the ratio of components B1):B2) is from 1:20 to 20:1.

11. The thermoplastic molding composition according to claim 1, wherein B1) and B2) have a degree of branching of 20 to 99%.

12. The thermoplastic molding composition according to claim 1, wherein B1) and B2) have a degree of branching of 20 to 95%.

13. The thermoplastic molding composition according to claim 1, wherein component B) comprises component B1) and component B1) has a number-average molar mass Mn of from 200 to 12 000 g/mol.

14. The thermoplastic molding composition according to claim 1, wherein component B) comprises component B1) and component B1) has a number-average molar mass Mn of from 500 to 10 000 g/mol.

15. The thermoplastic molding composition according to claim 1, wherein component B) comprises component B2) and where x is at least 1.3 and y is at least 2.5.

16. The thermoplastic molding composition according to claim 1, wherein component B) comprises component B2).

17. The thermoplastic molding composition according to claim 1, wherein component B) comprises component B2) and component B2) has a molar mass $M_w$ of 500 to 50,000 g/mol.

18. The thermoplastic molding composition according to claim 1, wherein component B) comprises component B2) and component B2) has a polydispersity of 1.4 to 40.

19. A fiber, a foil, or a molding, obtainable from the thermoplastic molding composition according to claim 1.

20. A method of making a fiber, foil, or molding, the method
   comprising: preparing a thermoplastic molding composition according to claim 1; and forming a fiber, foil, or molding from the thermoplastic molding composition.

* * * * *